US012384061B2

(12) United States Patent
Swann et al.

(10) Patent No.: US 12,384,061 B2
(45) Date of Patent: Aug. 12, 2025

(54) SAFEGUARD ENCLOSURE AND METHOD OF OPERATING AN AUTONOMOUS PART PROCESSING SYSTEM

(71) Applicant: TE Connectivity Solutions GmbH, Schaffhausen (CH)

(72) Inventors: Anthony L. Swann, Lancaster, PA (US); Swapnilsinh Solanki, Harrisburg, PA (US); Tim Burk, Middletown, PA (US); Craig S. Roper, Mount Joy, PA (US)

(73) Assignee: TE Connectivity Solutions GmbH (CH)

( * ) Notice: Subject to any disclaimer, the term of this patent is extended or adjusted under 35 U.S.C. 154(b) by 287 days.

(21) Appl. No.: 18/159,225

(22) Filed: Jan. 25, 2023

(65) Prior Publication Data

US 2024/0246249 A1    Jul. 25, 2024

(51) Int. Cl.
*B25J 19/06*    (2006.01)
*B25J 9/16*    (2006.01)

(52) U.S. Cl.
CPC .............. *B25J 19/06* (2013.01); *B25J 9/162* (2013.01); *B25J 9/1676* (2013.01); *B25J 9/1697* (2013.01)

(58) Field of Classification Search
CPC . B25J 19/06; B25J 9/162; B25J 9/1676; B25J 9/1697; B25J 21/00
See application file for complete search history.

(56) References Cited

U.S. PATENT DOCUMENTS

| 2012/0163953 A1* | 6/2012 | Murano | B65G 61/00 414/788.1 |
| 2021/0116923 A1* | 4/2021 | Swann | B25J 13/086 |
| 2023/0303354 A1* | 9/2023 | Fei | B65H 19/123 |
| 2023/0416035 A1* | 12/2023 | Swann | B65H 18/103 |

* cited by examiner

Primary Examiner — Ian Jen
Assistant Examiner — Renee LaRose

(57) ABSTRACT

A safeguard enclosure of an autonomous part processing system for enclosing an autonomous guided vehicle (AGV) is provided. The safeguard enclosure includes a frame having panels defining an enclosed space. The frame has an opening allowing the AGV to enter and exit the enclosed space. The frame surrounds a parking spot for the AGV in the enclosed space. The safeguard enclosure includes a safety system for controlling operation of the AGV. The safety system includes an AGV location sensor configured to detect presence of the AGV at the parking spot. The safety system configured to control operation of the AGV based on an AGV location signal from the AGV location sensor. The safety system includes a presence sensor configured to detect presence of an object other than the AGV in the enclosed space. The safety system configured to control operation of the AGV based on an object presence signal from the presence sensor.

20 Claims, 6 Drawing Sheets

SAFEGUARD ENCLOSURE AND METHOD OF OPERATING AN AUTONOMOUS PART PROCESSING SYSTEM

BACKGROUND OF THE INVENTION

The subject matter herein relates generally to autonomous guided vehicles.

AGVs (Automatic Guided Vehicles) are becoming increasingly popular in production facilities to transport parts and materials autonomously from one location to the another one. Production facilities that utilize AGVs typically include workstations where an operator processes parts and loads the parts onto the AGVs. Such systems typically involve considerable human processing and time to load the parts. Some know AGVs have been proposed that automatically load the parts at workstations, such as using a robotic arm to pick up the parts and load the parts into the AGV. However, during use, the robotic arm moves in the space around the AGV. Such movements may lead to damage of the robotic arm if the robotic arm bumps into an object in the vicinity of the AGV during the loading process. Additionally, the robotic arm may injure human operators that are working in the vicinity of the AGV.

A need remains for a system that allows safe operation of an autonomous mobile vehicle in a controlled work environment.

BRIEF DESCRIPTION OF THE INVENTION

In one embodiment, a safeguard enclosure of an autonomous part processing system for enclosing an autonomous guided vehicle (AGV) is provided. The safeguard enclosure includes a frame having panels defining an enclosed space. The frame has an opening allowing the AGV to enter and exit the enclosed space. The frame surrounds a parking spot for the AGV in the enclosed space. The safeguard enclosure includes a safety system for controlling operation of the AGV. The safety system includes an AGV location sensor configured to detect presence of the AGV at the parking spot. The safety system configured to control operation of the AGV based on an AGV location signal from the AGV location sensor. The safety system includes a presence sensor configured to detect presence of an object other than the AGV in the enclosed space. The safety system configured to control operation of the AGV based on an object presence signal from the presence sensor.

In another embodiment, an autonomous part processing system is provided and includes a part processing station for processing parts. The autonomous part processing system includes an autonomous guided vehicle (AGV) movable relative to the part processing station. The AGV has a base and a platform assembly supported by the base. The base has a motor that drives wheels to move the AGV in a logistics facility. The platform assembly includes a collaborative manipulator has an arm and an end effector at an end of the arm. The end effector configured to manipulate the parts. The autonomous part processing system includes a safeguard enclosure positioned adjacent the part processing station. The safeguard enclosure enclosing the AGV when the AGV is manipulating the parts at the part processing station. The safeguard enclosure includes a frame has panels defining an enclosed space. The frame has an opening allowing the AGV to enter and exit the enclosed space. The frame surrounds a parking spot for the AGV in the enclosed space, wherein the AGV is configured to interface with the parts at the part processing station when the AGV is at the parking spot. The safeguard enclosure includes a safety system for controlling operation of the AGV. The safety system includes an AGV location sensor configured to detect presence of the AGV at the parking spot. The safety system configured to control operation of the AGV based on an AGV location signal from the AGV location sensor. The safety system includes a presence sensor configured to detect presence of an object other than the AGV in the enclosed space. The safety system configured to control operation of the AGV based on an object presence signal from the presence sensor.

In a further embodiment, a method of processing parts using an autonomous guided vehicle (AGV) is provided. The method guides the AGV into a safeguard enclosure. The safeguard enclosure includes a frame that has panels defining an enclosed space surrounds a parking spot for the AGV in the enclosed space. The safeguard enclosure includes a safety system for controlling operation of the AGV. The safety system includes an AGV location sensor configured to detect presence of the AGV at the parking spot. The safety system includes a presence sensor configured to detect presence of an object other than the AGV in the enclosed space. The method controls operation of the AGV based on an AGV location signal from the AGV location sensor and controls operation of the AGV based on an object presence signal from the presence sensor.

DETAILED DESCRIPTION OF THE INVENTION

Figure 1:
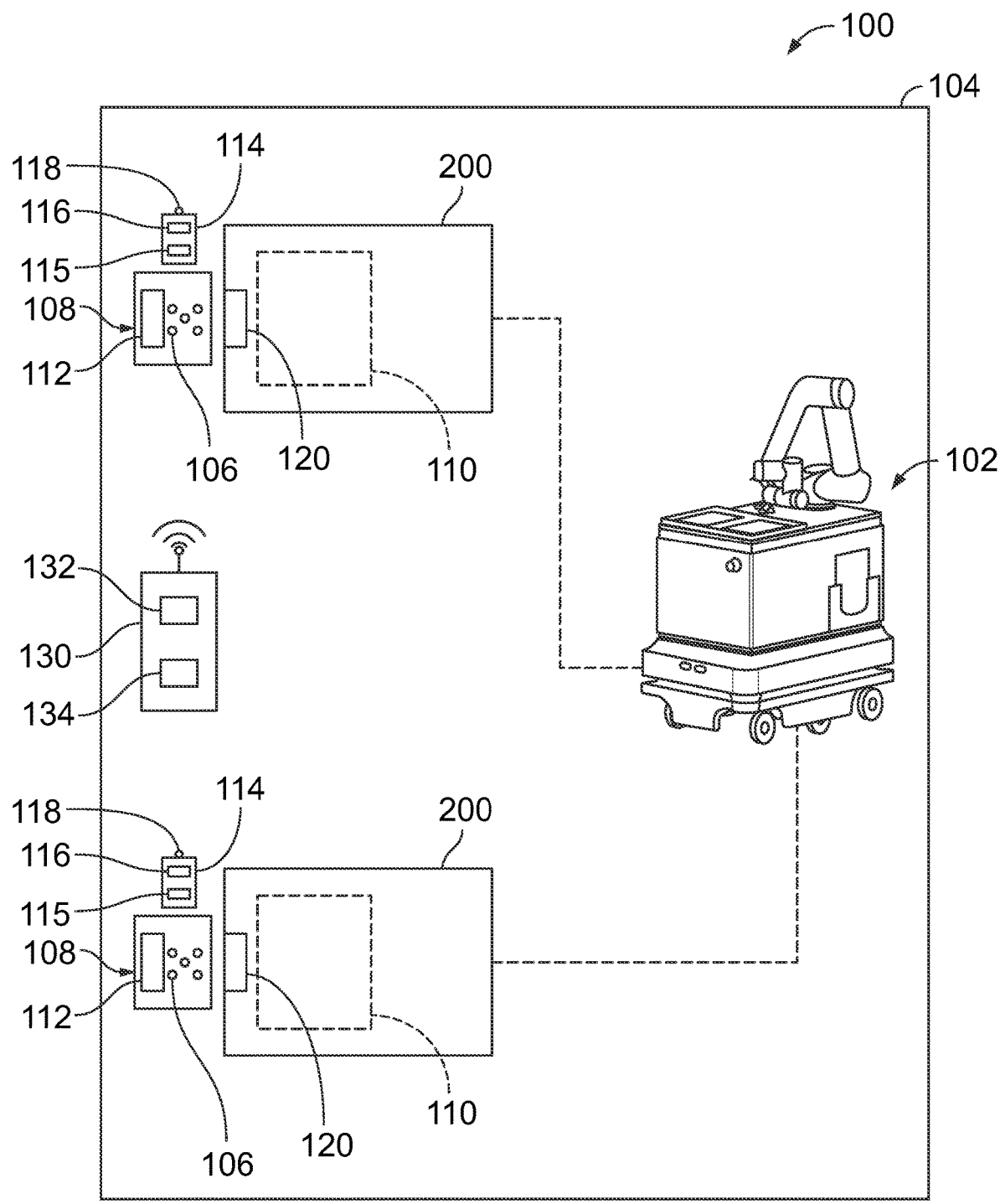
FIG. 1 is a schematic illustration of an autonomous part processing system in accordance with an exemplary embodiment.

FIG. 1 is a schematic illustration of an autonomous part processing system 100 in accordance with an exemplary embodiment. The autonomous part processing system 100 is used to control movements of one or more automatic guided vehicles (AGVs) 102 within a logistics facility 104, such as a warehouse, a distribution center, and manufacturing facility, a retail facility, and the like. The AGV 102 may be a mobile robot or autonomous mobile vehicle. In various embodiments, multiple AGVs 102 are used within the logistics facility 104 and controlled relative to each other by the autonomous part processing system 100. The AGVs 102 are automatically controlled and used for part processing, such as part pick up, part assembly, part loading, labeling, part drop-off, and the like within the logistics facility 104.

In an exemplary embodiment, various processes may occur within a safeguard enclosure 200 at a processing station 108. The safeguard enclosure 200 is used to protect the AGV 102 from damage and/or to prevent injury to persons working within the logistics facility. In an exemplary embodiment, the safeguard enclosure 200 includes a safety system that controls operation of the AGV 102 to restrict/allow operation under certain conditions to prevent damage and injury.

In an exemplary embodiment, the AGVs 102 may be used to pick up parts 106 (for example, boxes, bins, individual parts of a product, individual products, and the like) from one or more processing stations 108. The AGVs may be used to manipulate, form, assemble, package, or perform other processes to the parts at the processing stations 108. The AGVs 102 may be used to deliver the parts 106 to one or more drop off stations. In various embodiments, the processing stations 108 may be manned working stations where an operator or user is stationed at the working station to perform loading, unloading, assembly, sorting or other tasks. In other various embodiments, tasks at the processing stations 108 may be performed autonomously (without human action) by one or more robots and/or by the AGVs 102.

In an exemplary embodiment, a defined parking spot 110 for the AGV 102 is provided at or adjacent to the processing station 108. The safeguard enclosure 200 may enclose the parking spot to shield the AGV 102 when parked at the parking spot 110. The AGV 102 navigates to the parking spot 110 and stops at the parking spot 110 for processing the parts 106. In an exemplary embodiment, the processing station 108 includes one or more processing machines 112 that processes the parts 106. For example, the processing machine 112 may be a sorting machine for sorting parts, a forming machine for forming parts, a molding machine for molding parts, an assembly machine for assembling parts into an assembly, a packing machine for packing the parts into a box or bin, a labeling machine for labeling the parts, and the like. In various embodiments, the processing station 108 may include multiple processing machines 112 adjacent the parking spot 110. As such, the parts 106 from the multiple processing machines 112 may be manipulated and handled by the AGV 102 at a single stop and/or the parts 106 may undergo multiple processing steps (for example, parts may be molded, other parts may be formed, the parts may be assembled, and many parts may be packaged into a box prior to loading the box onto the AGV 102).

In an exemplary embodiment, the processing station 108 includes a call module 114. The call module 114 is accessible to the operator to allow the operator to communicate with the autonomous part processing system 100. The call module 114 includes a user interface 116. The user interface 116 includes one or more activation buttons 118 configured to be activated by the operator. The operator may activate the activation buttons 118 to initiate certain operations. For example, the operator may activate the activation buttons 118 to make a call request for a part pick up by the AGV 102 at the processing station 108. The operator may activate the activation buttons 118 upon completion of the part pick up, such as when all of the parts are loaded onto the AGV 102 to signal pick up completion and cause the AGV 102 to move out of the processing station 108. The activation buttons 118 may include an emergency stop button to stop operation of the AGV 102. The activation buttons 118 may be push buttons, toggle switches, and the like. In various embodiments, the user interface 116 may be a touch screen. The user interface 116 may be a keypad or keyboard. In various embodiments, the call module 114 may be mobile, such as being worn by or carried by the operator. The call module 114 includes a communication module 115 configured to communicate with other components of the autonomous part processing system 100. The communication module 115 may communicate wirelessly, such as via Wi-Fi.

In an exemplary embodiment, the logistics facility 104 includes a docking station 120 for the AGV 102. The docking station 120 may be used to store and or charge the AGV 102. The docking station 120 may be provided at the processing station 108. For example, the docking station 120 may be provided at the parking spot 110. In an exemplary embodiment, the docking station 120 may be provided within the safeguard enclosure 200. In other embodiments, the docking station 120 may be separate or remote from the processing station 108. In such embodiments, a separate safeguard enclosure 200 may be provided at the docking station 120.

In an exemplary embodiment, the autonomous part processing system 100 includes a system control module 130 located within the logistics facility 104. The system control module 130 may include a circuit board or other control circuit to control operation of the autonomous part processing system 100. The system control module 130 may receive inputs and generate outputs to control operation of the autonomous part processing system 100.

In an exemplary embodiment, the system control module 130 includes a system communication module 132 communicatively coupled with the communication modules 115 of the call modules 114 and communicatively coupled to the AGVs 102. The system communication module 132 may communicate wirelessly with the communication modules 115 and the AGVs 102. The system communication module 132 may include an antenna for wireless communication. In other various embodiments, the system communication module 132 may communicate over a wired connection with the call modules 114, such as via a communication bus.

The system control module 130 is communicatively coupled to the processing stations 108 to receive requests, tasks, status signals, and the like. For example, the system control module 130 may communicate with the communication modules 115 of the call modules 114 to receive signals and requests from the call modules 114. The system control module 130 is communicatively coupled to the AGVs 102 to control the AGVs 102 within the logistics facility 104, such as movement of the AGVs 102 to/from the stations 108, 110. The system control module 130 controls movement of the AGVs 102 between the multiple stations 108. The system control module 130 controls operations of components of the AGV 102, such as to control collaborative manipulators of the AGVs 102. The AGVs 102 transport the parts 106 autonomously from one location to another, such as between the stations 108 based on control signals received from the system control module 130. In an exemplary embodiment, the system control module 130 is configured to receive manual calls or signals to perform a task at the processing stations 108. For example, an operator or user may manually activate the activations buttons 118 to call the AGVs 102 to the corresponding processing station 108, such as to pick up the products 106. The products 106 may be manually loaded or automatically loaded onto the AGV 102 for removal form the processing station 108. In an exemplary embodiment, the system control module 130 is configured to receive automated calls or signals to perform a task at the processing stations 108. The system control module 130 controls the AGVs 102 based on the manual signals and the automated signals.

In an exemplary embodiment, the system control module 130 includes one or more processors 134 for controlling the autonomous part processing system 100. The processors 134 receive inputs, perform calculations, make operation decisions, send outputs, and the like to control operations of the components of the autonomous part processing system 100. For example, the processors 134 may receive signals from the processing stations 108, from the docking stations 120, from the safeguard enclosures 200 from the AGVs 102, and the like. The processors 134 process the signals to control the AGVs 102. For example, the processors 134 navigate the AGVs 102 within the logistics facility 104 between the processing stations 108. The processors 134 may control movements or operations of components of the AGV's 102, such as the collaborative manipulators.

Figure 2:
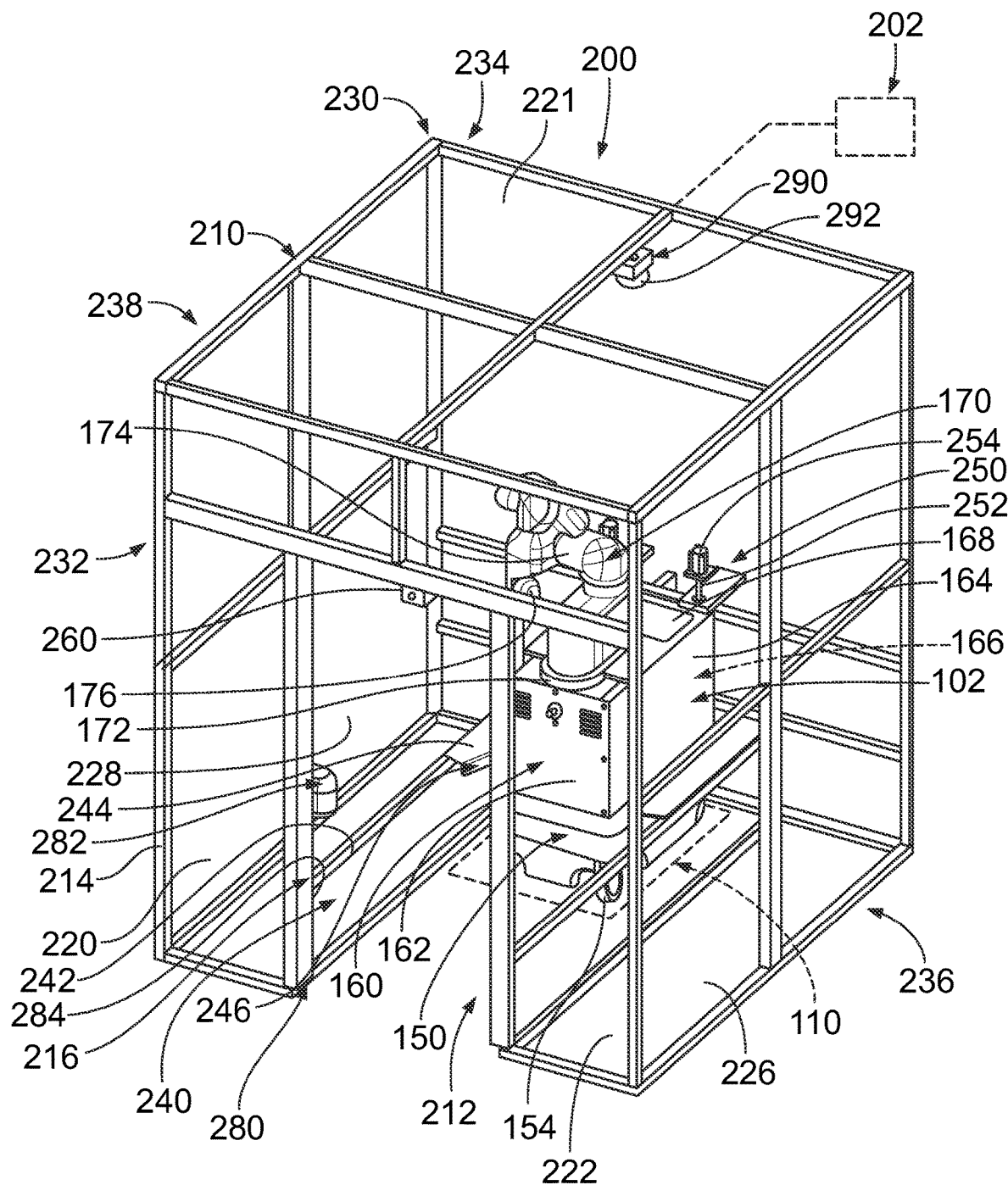
FIG. 2 is a front perspective view of the safeguard enclosure in accordance with an exemplary embodiment showing the AGV in the safeguard enclosure.
Figure 3:
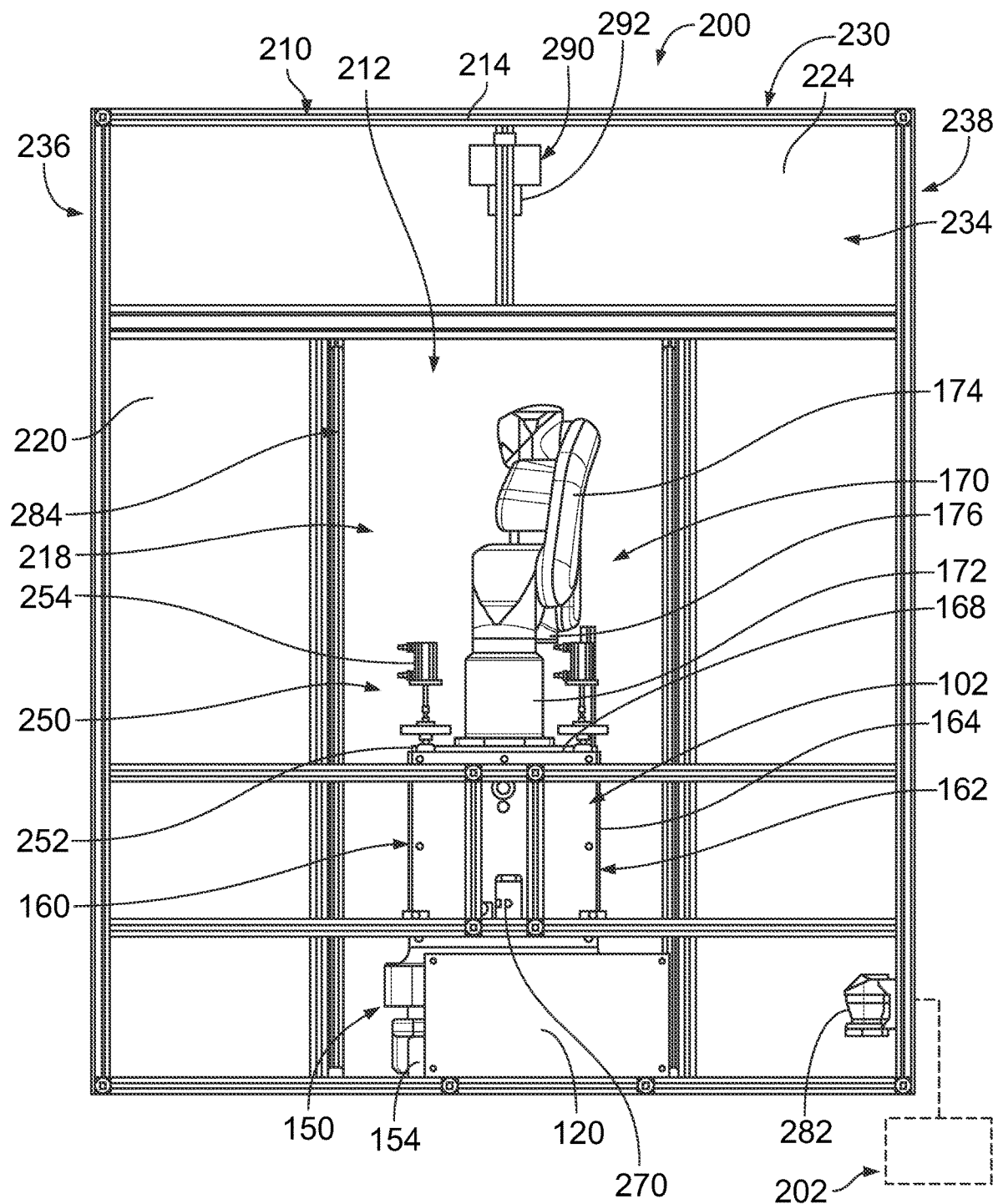
FIG. 3 is a rear view of the safeguard enclosure in accordance with an exemplary embodiment showing the AGV in the safeguard enclosure.
Figure 4:
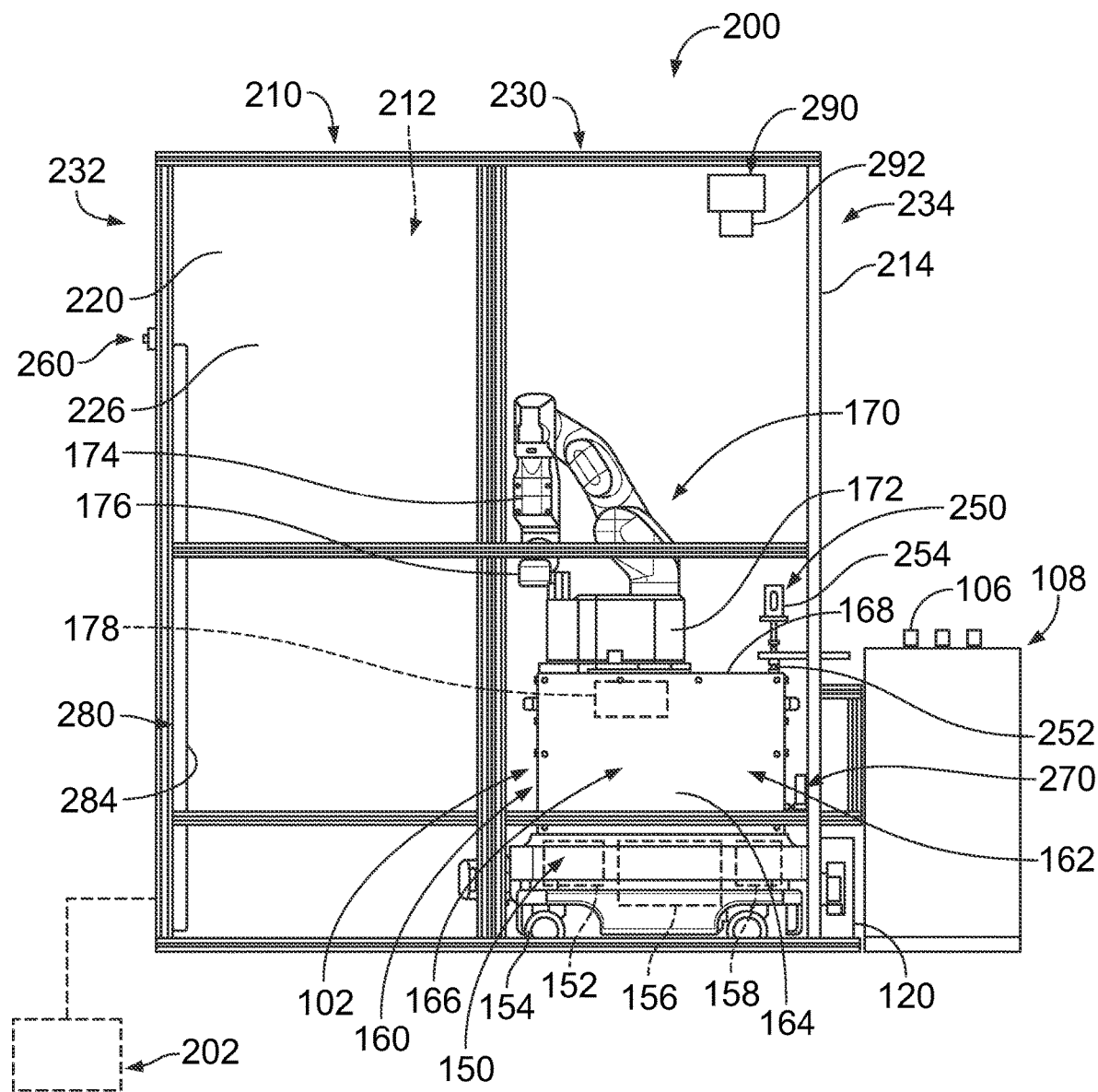
FIG. 4 is a side view of the safeguard enclosure in accordance with an exemplary embodiment showing the AGV in the safeguard enclosure.

FIG. 2 is a front perspective view of the safeguard enclosure 200 in accordance with an exemplary embodiment showing the AGV 102 in the safeguard enclosure 200. FIG. 3 is a rear view of the safeguard enclosure 200 in accordance with an exemplary embodiment showing the AGV 102 in the safeguard enclosure 200. FIG. 4 is a side view of the safeguard enclosure 200 in accordance with an exemplary embodiment showing the AGV 102 in the safeguard enclosure 200. The safeguard enclosure 200 is used to protect the AGV 102 from damage and/or to prevent injury to persons working within the logistics facility. In an exemplary embodiment, the safeguard enclosure 200 includes a safety system 202 that controls operation of the AGV 102 to restrict/allow operation under certain conditions to prevent damage and injury. The safety system 202 may be communicatively coupled to the system control module 130 (shown in FIG. 1). Optionally, various components of the safety system 202 (for example, controllers, processors, and the like) may be part of the system control module 130.

The AGV 102 includes a base 150 and a platform assembly 160 coupled to the base 150. The base 150 houses a motor 152 and wheels 154 driven by the motor 152 for moving the AGV 102. The AGV 102 includes a battery 156 coupled to the motor 152 to power the motor 152. In an exemplary embodiment, the AGV 102 includes an AGV controller 158 for controlling movement of the AGV 102. The AGV controller 158 is operably coupled to the motor 152. The AGV controller 158 controls operation of the motor 152 to move the AGV 102. The AGV controller 158 is communicatively coupled to the system control module 130 and/or the safety system 202 to receive control signals for operating the AGV 102. For example, the AGV controller 158 may receive route information to guide the AGV 102 along a particular path, such as between the processing stations 108 (shown in FIG. 1). The AGV controller 158 may receive movement information to guide the AGV within the safeguard enclosure 200, such as to the parking spot 110. The AGV controller 158 may receive information instructing the AGV 102 to stop, to move forward, to move rearward, and/or to turn right or left for controlling movement of the AGV 102.

The platform assembly 160 includes a platform enclosure 162 and a collaborative manipulator 170 coupled to the top of the platform enclosure 162. The platform enclosure 162 includes walls 164 enclosing a cavity 166. The cavity 166 may house components of the platform assembly 160. The cavity 166 may form a space to receive the parts 106, such as for transport by the AGV 102. In an exemplary embodiment, the platform assembly 160 includes a support plate 168 at a top of the platform enclosure 162. The support plate 168 supports the collaborative manipulator 170. The bottom of the platform enclosure 162 is mounted to the base 150 of the AGV 102. The platform assembly 160 is moved with the AGV 102. In an exemplary embodiment, the platform assembly 160 includes an emergency stop button (not shown) on one of the walls of the platform enclosure 162 that may be used to stop operation of the AGV 102 and/or the collaborative manipulator 170.

In an exemplary embodiment, the collaborative manipulator 170 includes a mounting base 172 that is mounted to the support plate 168, such as using fasteners. The mounting base 172 fixes the collaborative manipulator 170 relative to the platform assembly 160. In an exemplary embodiment, the collaborative manipulator 170 includes an arm 174 and an end effector 176 at an end of the arm 174 used for manipulating the parts 106, such as picking up the parts 106 and moving the parts 106. The end effector 176 may include a gripper, such as pinching fingers or vacuum grippers to hold the parts 106. The arm 174 may be a four-axis manipulating arm or a six-axis manipulating arm in various embodiments. Other types of robot arms may be used in alternative embodiments. In other various embodiments, other types of part manipulators may be utilized rather than the end effector 176 and/or the arm 174. For example, the collaborative manipulator 170 may include a conveyor or other type of manipulator.

In an exemplary embodiment, the platform assembly 160 includes a collaborative manipulator controller 178 for the collaborative manipulator 170. The collaborative manipulator controller 178 controls operation of the collaborative manipulator 170. For example, the collaborative manipulator controller 178 controls operation of the arm 174 and controls operation of the end effector 176. The collaborative manipulator controller 178 may be contained within the platform enclosure 162. The collaborative manipulator controller 178 is communicatively coupled to the system control module 130 and/or the safety system 202 and/or the AGV controller 158 to send control signals therebetween.

In an exemplary embodiment, the collaborative manipulator controller 178 is configured to move the arm 174 and the end effector 176 to a home position. In the home position, the arm 174 and the end effector 176 may be contained within the footprint or envelope of the base 150. For example, the arm 174 and the end effector 176 may be consolidated or folded into a compact arrangement. The collaborative manipulator 170 is moved to the home position to make the AGV 102 as small as possible to move the AGV 102. By collapsing the collaborative manipulator 170 inward into the condensed arrangement the risk of damage to the collaborative manipulator 170 or damaging other machines or components in the logistics facility or injuring a person during moving is reduced.

The safeguard enclosure 200 includes a frame 210 having panels 220 defining an enclosed space 212. The frame 210 surrounds the parking spot 110 for the AGV 102 in the enclosed space 212. In an exemplary embodiment, the docking station 120 is coupled to the frame 210, such as at the parking spot 110. The AGV 102 is configured to be docked at the docking station 120 when the AGV 102 is parked at the parking spot 110 to recharge the AGV 102. The enclosed space 212 is large enough to allow the AGV 102 to operate without interference with the frame 210. For example, the collaborative manipulator 170 may move in three-dimensional space without crashing into the frame 210. The frame 210 keeps other objects and persons outside of the enclosed space 212 to prevent damage to the collaborative manipulator 170 and/or injury to the person. The safety system 202 provides safety measures to shut down operation of the AGV 102 if other objects or persons are detected within the enclosed space 212.

In an exemplary embodiment, the frame 210 includes a plurality of frame members 214 that support the panels 220.

The frame members 214 may include vertical members and horizontal members. For example, the frame members 214 may include a bottom plate, a top plate, studs, headers, Sills, cripple studs, blocks, cross-braces, and the like. The panels 220 may be coupled to the exterior surfaces of the frame members 214 and/or the interior surfaces of the frame members 214.

In various embodiments, the safeguard enclosure 200 may be rectangular having a top 230, a front 232, a rear 234, a first side 236, and a second side 238. The bottom of the safeguard enclosure 200 may rest on the floor. The safeguard enclosure 200 may have other shapes having greater or fewer walls in alternative embodiments. The panels 220 include one or more front panels 222, one or more rear panels 224, one or more first side panels 226, and one or more second side panels 228. The panels 220 may include top panels 221. The panels 220 prevent ingress and egress through the walls of the safeguard enclosure 200. In an exemplary embodiment, the safeguard enclosure 200 includes an opening 216 at the front 232. The opening 216 allows the AGV 102 to enter and exit the enclosed space 212. Optionally, a door (not shown) may be provided to close the opening 216. In an exemplary embodiment, the safeguard enclosure 200 includes a port 218 at the rear 234. The port 218 may be provided at other locations in alternative embodiments, such as at the first side 236 and/or at the second side 238. The port 218 may be located adjacent the processing station 108. The port 218 provides access through the corresponding wall of the frame 210, such as to allow the AGV 102 to interface with parts at the processing station 108 outside of the enclosed space 212 through the port 218. The parking spot 110 may be located adjacent the port 218.

In an exemplary embodiment, the safeguard enclosure 200 includes a guide track 240 to guide the AGV 102 within the enclosed space 212. In various embodiments, the guide track 240 includes rails 242 extending between the front 232 and the rear 234. The rails 242 extend from the opening 216 to the parking spot 110. The rails 242 define a runway for the AGV 102 to move between the opening 216 and the parking spot 110. In an exemplary embodiment, the guide track 240 includes guide panels 244 forming a funnel 246 two laterally position the AGV 102 within the frame 210. The guide panels 244 may be coupled to the rails 242, such as proximate to the rear 234. The guide panels 244 may be located at the parking spot 110 to guide the AGV 102 into the parking spot 110. The guide panels 244 laterally position the AGV 102 between the rails 242, such as centered between the rails 242. As the AGV 102 moves into the safeguard enclosure 200, the AGV 102 may engage one or more of the guide panels 244 to properly position the AGV 102 relative to the frame 210. The guide panels 244 may engage the base 150 and/or the platform enclosure 162 of the AGV 102 to position the AGV 102 side-to-side within the guide track 240. Other types of guide features may be used in alternative embodiments to position the AGV 102 within the enclosed space 212.

In an exemplary embodiment, the safeguard enclosure 200 includes a securing device 250 to secure the AGV 102 relative to the frame 210. For example, the securing device 250 may interface with the AGV 102 when the AGV 102 is in the parking spot 110. The securing device 250 may hold the AGV 102 in the parking spot 110 when the collaborative manipulator 170 is operated to interface with the parts 106. In an exemplary embodiment, the securing device 250 includes one or more locking pins 252 that are movable between a locked position and an unlocked position. Actuators 254 are operably coupled to the locking pins 252 to move the locking pins 252 between the unlocked position and the locked position.

In an exemplary embodiment, the safeguard enclosure 200 includes one or more AGV location sensors 270 configured to sense a location of the AGV 102 within the enclosed space 212. For example, the AGV location sensor 270 may detect presence of the AGV 102 at the parking spot 110. In various embodiments, the AGV location sensor 270 is a proximity sensor. The AGV location sensor 270 may be a non-contact safety sensor, such as a magnetic safety switch, a transponder safety switch, an inductive safety switch, and the like. The AGV location sensor 270 may be provided at the rear 234 of the frame 210, such as proximate to the port 218. The AGV location sensor 270 detects when the AGV 102 is located at the port 218. The AGV location sensor 270 is configured to transmit AGV location signals, such as to the safety system 202. For example, the AGV location sensor 270 may transmit a first signal, such as a PRESENT signal when the AGV 102 is at the parking spot 110. The AGV location sensor 270 may transmit a second signal, such as an ABSENT signal when the AGV 102 is not detected at the parking spot 110. In other various embodiments, no signal is sent when the AGV 102 is not detected at the parking spot 110. Other AGV location signals may be transmitted in alternative embodiments.

During operation, when the presence of the AGV 102 is detected, the securing device 250 may be operated to interface with the AGV 102 and secure the AGV 102 and the parking spot. For example, the actuators 254 may be operated when an AGV location signal is transmitted by the AGV location sensor 270. When the presence of the AGV 102 is detected, the safety system 202 may allow the AGV 102 to operate normally, such as to allow the collaborative manipulator 170 to be utilized. However, when the presence of the AGV 102 is not detected, the safety system 202 may restrict operation of the AGV 102, such as to restrict operation of the collaborative manipulator 170. In various embodiments, the safety system 202 may restrict operation of the AGV 102 until the securing device 250 properly secures the AGV 102 relative to the frame 210.

In an exemplary embodiment, the safeguard enclosure 200 includes one or more presence sensors 280 configured to detect presence of an object in the enclosed space 212. The presence sensor 280 may be used to detect presence of objects other than the AGV 102. The presence sensor 280 may be used to detect presence of a person in the enclosed space 212. The presence sensor 280 is configured to transmit object presence signals, such as when the object is detected and/or when no object is detected. The safety system 202 is configured to control operation of the AGV 102 based on object presence signals from the presence sensor 280. For example, when the presence of an object is detected, the safety system 202 may restrict operation of the AGV 102. In an exemplary embodiment, the safety system 202 stops movement of the collaborative manipulator 170 when the presence of an object is detected. When no object is detected, the safety system 202 allows normal operation of the AGV 102. For example, the collaborative manipulator 170 may move within the enclosed space 212 to manipulate the parts 106.

In an exemplary embodiment, the presence sensors 280 include an enclosure scanner 282 configured to scan the enclosed space 212 for objects. For example, the enclosure scanner 282 may detect movement of an object within the enclosed space 212. The enclosure scanner 282 may be a motion sensor. Other types of scanners may be used in alternative embodiments. The enclosure scanner 282 may scan certain regions of the enclosed space 212, such as above or below a particular height, the area of forward of the AGV 102, or the areas to the left or right sides of the AGV 102. The enclosure scanner 282 may intentionally avoid scanning certain regions of the enclosed space 212, such as the region where the collaborative manipulator 170 is able to move to avoid sensing movement of the collaborative manipulator 170. In an exemplary embodiment, the safety system 202 shuts down operation of the AGV 102 when the object is detected in the enclosed space 212.

In an exemplary embodiment, the presence sensors 280 include an opening scanner 284 configured to detect objects passing through the opening 216. The opening scanner 284 may be a photoelectric sensor emitting one or more light beams from a light-emitting element. The photoelectric sensor may be a reflective type photoelectric sensor that detects the light beam when reflected from the object passing through the opening 216. The photoelectric sensor may be a through beam type sensor used to measure a change in light quality caused by an object crossing the optical axis. In other various embodiments, the opening scanner 284 may be a light curtain sensor used to detect the object passing through the opening 216. Other types of scanners or sensors may be used to detect objects within the opening 216. In an exemplary embodiment, the safety system 202 shuts down operation of the AGV 102 when the object is detected in the opening 216.

In an exemplary embodiment, the safeguard enclosure 200 includes an AGV detection sensor 260 at the opening 216 or within the enclosed space 212 to detect presence of the AGV 102. The AGV detection sensor 260 may disable the presence sensors 280, such as the enclosure scanner 282 and/or the opening scanner 284, when the AGV 102 is moving into and out of the enclosed space 212. As such, the safety system 202 does not improperly shut down the AGV 102 while the AGV 102 is moving through the opening 216 or the enclosed space 212 between the opening 216 and the parking spot 110. The AGV detection sensor 260 may disable the presence sensors 280 for a predetermined period of time to allow maneuvering of the AGV 102 into or out of the enclosed space 212.

In an exemplary embodiment, the safeguard enclosure 200 includes a vision system 290 to control operation of the AGV 102. The vision system 290 includes one or more imaging devices 292 configured to image the AGV 102, such as at the parking spot 110. In the illustrated embodiment, the imaging device 292 is provided at the top 230 of the frame 210. Other locations are possible in alternative embodiments. The vision system 290 may be configured to control operation of the AGV 102 based on the images from the imaging device 292. For example, the AGV 102 may be positioned (operation of the wheels) relative to the frame 210 using the images from the imaging device 292. In an exemplary embodiment, the collaborative manipulator 170 is controlled using the images from the imaging device 292. For example, the arm 174 and/or the end effector 176 may be operated based on the images. The images may detect a position of the end effector 176 and a position of the part 106 to move the arm 174 and/or the end effector 176 to manipulate the part 106.

Figure 5:
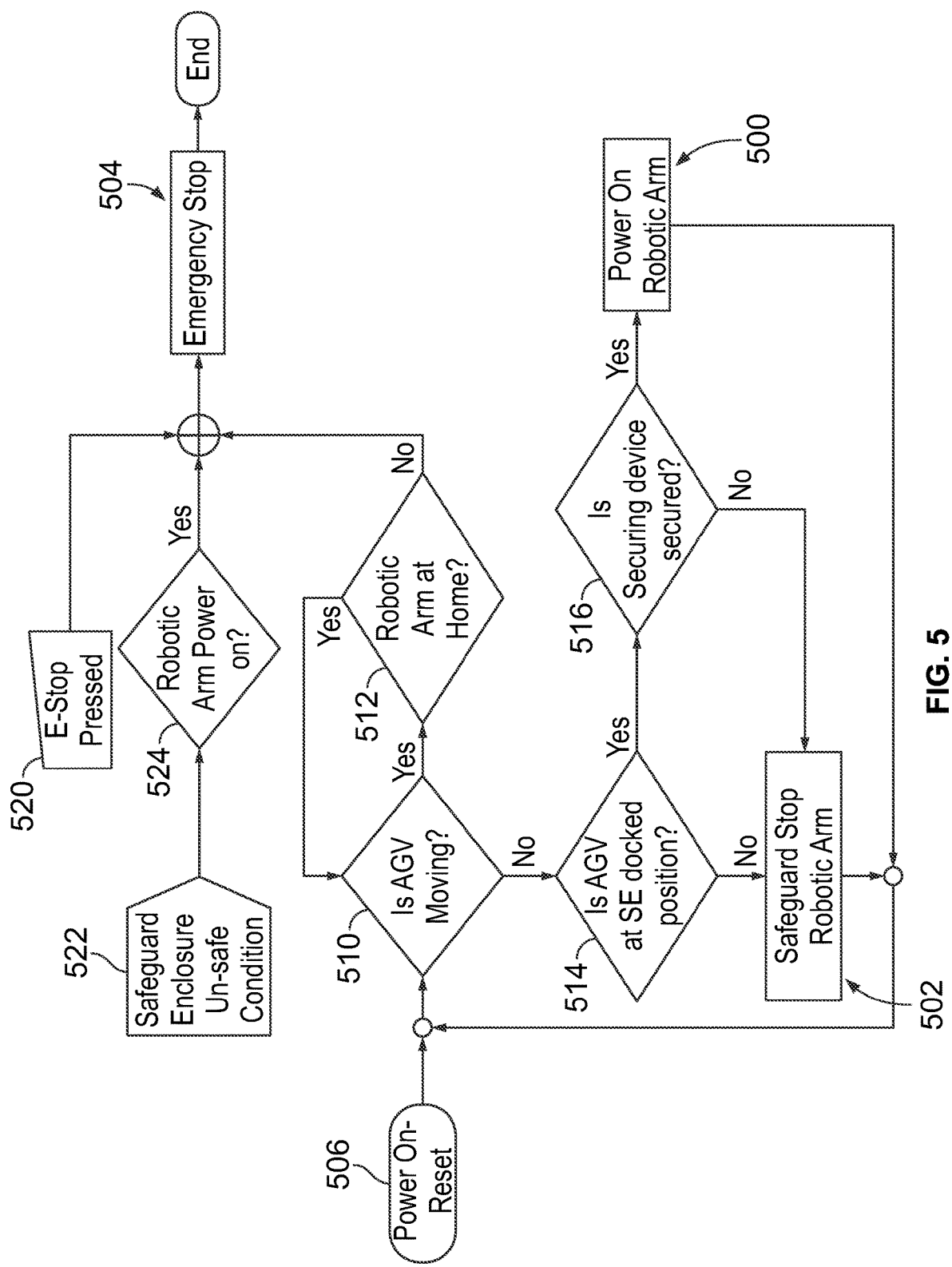
FIG. 5 is a flowchart showing a method of processing parts using an AGV in accordance with an exemplary embodiment.

FIG. 5 is a flowchart showing a method of processing parts using an AGV in accordance with an exemplary embodiment. The flowchart shows a method of operating the AGV in a normal mode of operation 500, in a safe mode of operation 502, and an emergency stop mode of operation 504. The method may be performed by a controller, such as the system control module. The safety system of the safeguard enclosure may provide inputs to the system control module to control operation of the AGV.

Operation of the AGV begins at step 506. The operation may begin by powering on the AGV. The operation may begin by resetting the system to begin operation of the AGV. For example, a reset button or power on button may be pressed by an operator to begin the operation of the AGV.

At 510, the system determines if the AGV is moving. The AGV controller may communicate with the system control module to determine if the AGV is moving. For example, the system may determine if the wheels of the AGV are rotating. Alternatively, the system may use a GPS system to determine if the AGV is moving. In other various embodiments, the system may use motion sensors to determine if the AGV is moving. If the AGV is moving, at 512, the system determines if the robotic arm of the collaborative manipulator is at the home position. The collaborative manipulator controller may send a signal to the system control module indicating the status or position of the collaborative manipulator. If the robotic arm is at the home position, the AGV is safe to move and thus the process continues in the AGV may continue normal operation. If the robotic arm is not at the home position, the system control module enters the emergency stop mode of operation 504 and shuts down the AGV. Because it may be unsafe for the AGV to move when the robotic arm is not in the home position, the system control module shuts down the AGV and does not allow the AGV to move until the system can be reset. For example, the robotic arm needs to be reset to the home position in the reset button on the AGV can then be pressed to restart the system at step 506.

Returning to step 510, if the system determines that the AGV is not moving, the system then determines 514 if the AGV is at the docked position at the parking spot. If the AGV is not at the docked position, the system control module enters the safe mode of operation 502. In the safe mode of operation, the AGV has restricted operation. For example, in the safe mode of operation, the AGV is able to move (for example, wheels can move); however, the robotic arm of the collaborative manipulator is restricted from movement. As such, the system control module is able to move the AGV to the docked position but the robotic arm of the collaborative manipulator is unable to perform tasks or move until the AGV is in the docked position. If, at step 514, the system determines that the AGV is in the docked position, the system then determines 516 if the AGV is secured within the safeguard enclosure at the parking spot. For example, the system determines if the securing device of the safeguard enclosure interfaces the AGV. The system may determine that the locking pins securely couple the AGV to the frame of the safeguard enclosure to restrict movement of the AGV from the parking spot. If the AGV is not secured, the system control module enters the safe mode of operation 502 and allows the AGV to have restricted operation. However, if the AGV is secured, the system control module enters the normal mode of operation 500 and allows the AGV to perform the designated tasks. For example, the system may power on the robotic arm and allow the collaborative manipulator to operate normally to perform the tasks.

The method of operation described herein allows safe operating of the AGV to reduce risk of damage to the collaborative manipulator, to reduce risk of damage to other machines or components, and to reduce risk of injury to human operators. The method of operation described herein limits or restricts movement of the robotic arm of the collaborative manipulator to a situation in which the AGV is safely and securely positioned within the safeguard enclosure.

In an exemplary embodiment, the system includes multiple safeguards to shut down the AGV in unsafe situations. For example, at 520, when an emergency stop button is pressed, the system control module enters the emergency stop mode of operation 504. The emergency stop button may be provided on the AGV, within the safeguard enclosure, at one of the processing machines, or at the system control module. In other various embodiments, at 522, if an unsafe condition is encountered within the safeguard enclosure, the system determines 524 if the power is on at the collaborative manipulator. If the power is on, the system control module enters the emergency stop mode of operation 504. However, if the power is off, the system may allow restricted operation of the AGV, such as to allow the AGV to move but to restrict movement of the collaborative manipulator. Unsafe conditions within the safeguard enclosure may be encountered when an object or person enter the enclosed space of the safeguard enclosure. For example, presence sensors are provided within the safeguard enclosure to monitor for objects or persons entering the enclosed space. If such objects or persons are identified within the enclosed space, it may be desirable to restrict or cease operation of the AGV to prevent damage or injury and thus the system may enter the emergency stop mode of operation 504.

Figure 6:
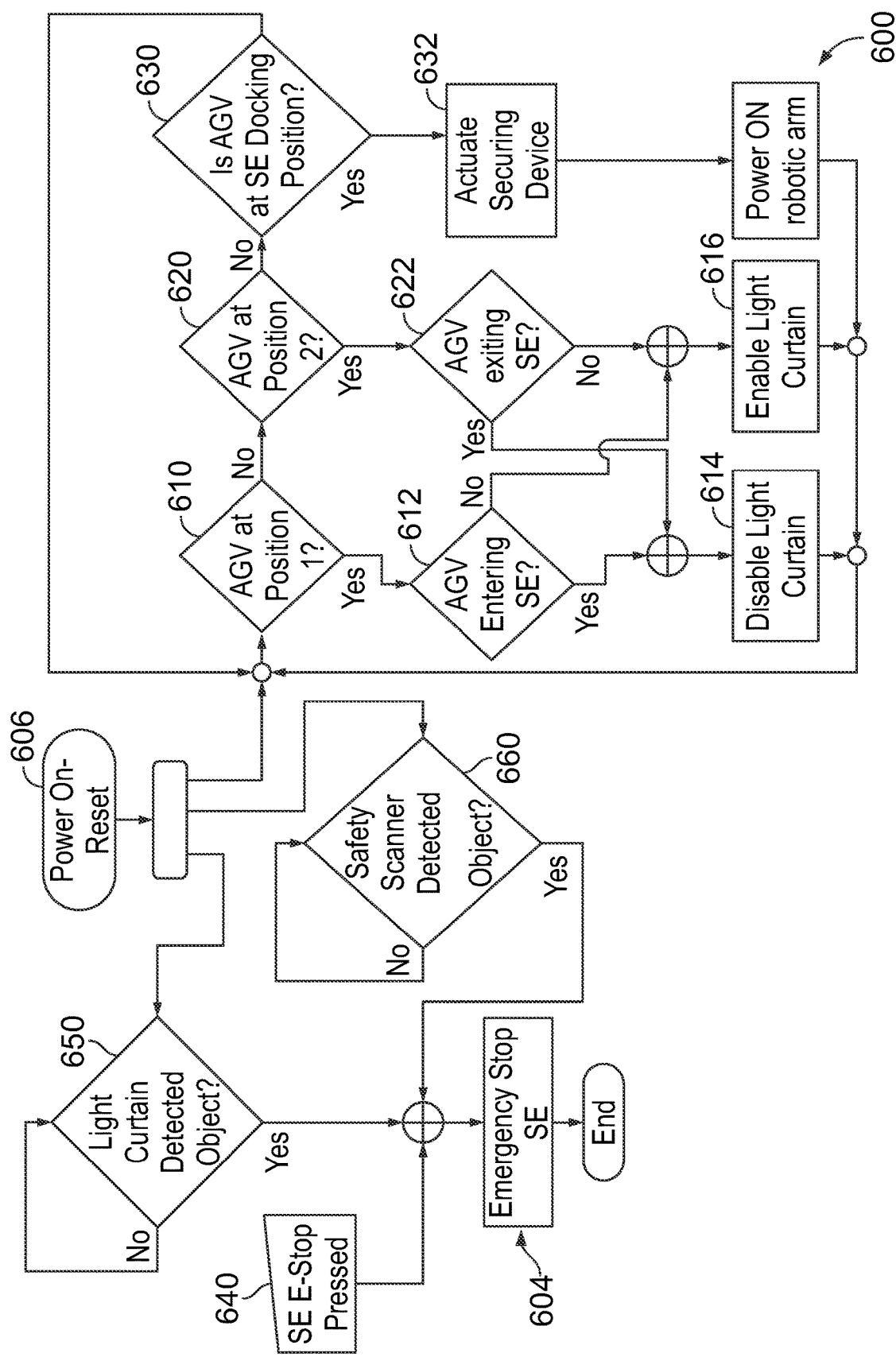
FIG. 6 is a flowchart showing a method of processing parts using an AGV in accordance with an exemplary embodiment.

FIG. 6 is a flowchart showing a method of processing parts using an AGV in accordance with an exemplary embodiment. The flowchart shows a method of operating the AGV in a normal mode of operation 600 and in an emergency stop mode of operation 604. The method may be performed by a controller, such as the system control module. The safety system of the safeguard enclosure may provide inputs to the system control module to control operation of the AGV.

Operation of the AGV begins at step 606. The operation may begin by powering on the AGV. The operation may begin by resetting the system to begin operation of the AGV. For example, a reset button or power on button may be pressed by an operator to begin the operation of the AGV. Various processes may be performed in series or in parallel by the system control module as the AGV is operating.

At 610, the system determines if the AGV is at a first entry position to the opening of the safeguard enclosure. The first entry position may be located outside of the safeguard enclosure, such as adjacent the opening to the safeguard enclosure. The AGV may be at the first entry position to enter the safeguard enclosure through the opening. If the AGV is at the first entry position, the system determines 612 if the AGV is entering the safeguard enclosure. For example, the system may determine if the AGV is moving toward the opening to enter the safeguard enclosure. If the AGV is entering the safeguard enclosure, at step 614, the system disables the light curtain. The light curtain is provided at the opening. The light curtain is disabled to allow the AGV to pass through the opening without triggering the emergency stop mode of operation. Returning to the decision at 612, if the system determines that the AGV is not entering the safeguard enclosure (for example, the AGV is stationary or moving away from the opening), at step 616, the system enables the light curtain. The light curtain is enabled as a safety feature for the safeguard enclosure, such as to detect objects or persons entering the safeguard enclosure through the opening.

At 620, the system determines if the AGV is at a second entry position to the opening of the safeguard enclosure. The second entry position may be located inside of the safeguard enclosure, such as adjacent the opening to the safeguard enclosure. The AGV may be at the second entry position to exit the safeguard enclosure through the opening. If the AGV is at the second entry position, the system determines 622 if the AGV is exiting the safeguard enclosure. For example, the system may determine if the AGV is moving toward the opening to exit the safeguard enclosure. If the AGV is exiting the safeguard enclosure, at step 614, the system disables the light curtain. The light curtain is disabled to allow the AGV to pass through the opening without triggering the emergency stop mode of operation. Returning to the decision at 622, if the system determines that the AGV is not exiting the safeguard enclosure (for example, the AGV is stationary or moving away from the opening), at step 616, the system enables the light curtain. The light curtain is enabled as a safety feature for the safeguard enclosure, such as to detect objects or persons entering the safeguard enclosure through the opening.

At 630, the system determines if the AGV is at the dock position at the parking spot. If the AGV is not at the dock position, the system continues to monitor the location of the AGV. If the AGV is in the dock position, the system activates 632 the securing device of the safeguard enclosure to interface with the AGV. For example, the system actuates the locking pins to engage the age of the and secure the AGV relative to the frame of the safeguard enclosure. Once the securing device is secured, the system control module enters the normal mode of operation 600 and allows the AGV to perform the designated tasks. For example, the system may power on the robotic arm of the collaborative manipulator and allow the collaborative manipulator to operate normally to perform the tasks.

The method of operation described herein allows safe operating of the AGV to reduce risk of damage to the collaborative manipulator, to reduce risk of damage to other machines or components, and to reduce risk of injury to human operators. The method of operation described herein limits or restricts movement of the robotic arm of the collaborative manipulator to a situation in which the AGV is safely and securely positioned within the safeguard enclosure and other objects or persons are outside of the enclosed space of the safeguard enclosure.

In an exemplary embodiment, the system includes multiple safeguards to shut down the AGV in unsafe situations. For example, at 640, when an emergency stop button is pressed, the system control module enters the emergency stop mode of operation 604. The emergency stop button may be provided on the AGV, within the safeguard enclosure, at one of the processing machines, or at the system control module. In other various embodiments, the system monitors the safeguard enclosure for unsafe conditions, such as objects or persons entering or within the enclosed space. At 650, the system determines if an object or person is present at the opening. For example, the light curtain monitors for objects or persons passing through the opening. When an object or person is detected, the system control module enters the emergency stop mode of operation 604. If such objects or persons are identified, it may be desirable to restrict or cease operation of the AGV to prevent damage or injury and thus the system may enter the emergency stop mode of operation 604. At 660, the system determines if an object or person is present within the enclosed space of the safeguard enclosure. For example, scanners or other monitoring devices are used to scan for objects or persons within the enclosed space. In various embodiments, motion detectors may be used to identify objects or persons within the enclosed space. If such objects or persons are identified, the system control module enters the emergency stop mode of operation 604.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A safeguard enclosure of an autonomous part processing system for enclosing an autonomous guided vehicle (AGV), the safeguard enclosure comprising:
    a frame having panels defining an enclosed space, the frame having an opening allowing the AGV to enter and exit the enclosed space, the frame surrounding a parking spot for the AGV in the enclosed space; and
    a safety system for controlling operation of the AGV, the safety system including an AGV location sensor configured to detect presence of the AGV at the parking spot, the safety system configured to control operation of the AGV based on an AGV location signal from the AGV location sensor, the safety system including a presence sensor configured to detect presence of an object other than the AGV in the enclosed space, the safety system configured to control operation of the AGV based on an object presence signal from the presence sensor, wherein the safety system allows normal operation of the AGV when presence of the AGV at the parking spot is detected by the AGV location sensor.

2. The safeguard enclosure of claim 1, wherein the panels include a front panel, a rear panel, a first side panel between the front and rear panels, and a second side panel between the front and rear panels, the front panel, the rear panel, the first side panel, and the second side panel surrounding the enclosed space on four sides.

3. The safeguard enclosure of claim 1, wherein the safety system stops operation of the AGV when the object is detected.

4. The safeguard enclosure of claim 3, wherein the safety system allows normal operation of the AGV when no object is detected.

5. The safeguard enclosure of claim 1, wherein the safety system restricts operation of the AGV when no presence of the AGV is detected by the AGV location sensor.

6. The safeguard enclosure of claim 1, wherein the presence sensor includes an enclosure scanner configured to detect the object within the enclosed space.

7. The safeguard enclosure of claim 1, wherein the presence sensor includes an opening scanner configured to detect the object passing through the opening.

8. The safeguard enclosure of claim 1, wherein the presence sensor is deactivated when the AGV moves between the opening and the parking spot.

9. The safeguard enclosure of claim 1, wherein the AGV location sensor includes a proximity sensor.

10. The safeguard enclosure of claim 1, further comprising a locking pin coupled to the frame, the locking pin being actuated to engage the AGV and secure a position of the AGV at the parking spot, the safety system being operably coupled to the locking pin and causing the locking pin to move to a locked position based on the AGV location signal from the AGV location sensor.

11. The safeguard enclosure of claim 1, wherein the frame further comprises a guide track extending between the opening in the parking spot to guide the AGV between the opening and the parking spot.

12. The safeguard enclosure of claim 1, further comprising a vision system having an imaging device configured to image the AGV at the parking spot, the vision system configured to control operation of the AGV based on images by the imaging device.

13. The safeguard enclosure of claim 1, wherein the safety system further comprises an emergency stop button, the safety system configured to control operation of the AGV based on an emergency stop signal from the emergency stop button.

14. The safeguard enclosure of claim 1, wherein the frame includes a port through one of the panels, the parking spot located adjacent the port to allow the AGV to interface with parts at a part processing station outside of the enclosed space through the port.

15. The safeguard enclosure of claim 1, wherein the safety system includes a communication module having an antenna configured to wirelessly communicate with the AGV to control operation of the AGV.

16. An autonomous part processing system comprising:
    a part processing station for processing parts;
    an autonomous guided vehicle (AGV) movable relative to the part processing station, the AGV having a base and a platform assembly supported by the base, the base having a motor driving wheels to move the AGV in a logistics facility, the platform assembly including a collaborative manipulator having an arm and an end effector at an end of the arm, the end effector configured to manipulate the parts; and
    a safeguard enclosure positioned adjacent the part processing station, the safeguard enclosure enclosing the AGV when the AGV is manipulating the parts at the part processing station, the safeguard enclosure including a frame having panels defining an enclosed space, the frame having an opening allowing the AGV to enter and exit the enclosed space, the frame surrounding a parking spot for the AGV in the enclosed space, wherein the AGV is configured to interface with the parts at the part processing station when the AGV is at the parking spot, the safeguard enclosure including a safety system for controlling operation of the AGV, the safety system including an AGV location sensor configured to detect presence of the AGV at the parking spot, the safety system configured to control operation of the AGV based on an AGV location signal from the AGV location sensor, the safety system including a presence sensor configured to detect presence of an object other than the AGV in the enclosed space, the safety system configured to control operation of the AGV based on an object presence signal from the presence sensor, wherein the safety system prevents operation of the collaborative manipulator based on an AGV location signal from the AGV location sensor and based on an object presence signal from the presence sensor.

17. A method of processing parts using an autonomous guided vehicle (AGV), the method comprising:
guiding the AGV into a safeguard enclosure, the safeguard enclosure including a frame having panels defining an enclosed space surrounding a parking spot for the AGV in the enclosed space, the safeguard enclosure including a safety system for controlling operation of the AGV, the safety system including an AGV location sensor configured to detect presence of the AGV at the parking spot, the safety system including a presence sensor configured to detect presence of an object other than the AGV in the enclosed space;
controlling operation of the AGV based on an AGV location signal from the AGV location sensor by restricting operation of the AGV when no presence of the AGV is detected by the AGV location sensor and allowing normal operation of the AGV when presence of the AGV at the parking spot is detected by the AGV location sensor; and
controlling operation of the AGV based on an object presence signal from the presence sensor by restricting operation of the AGV when the object is detected and allowing normal operation of the AGV when no object is detected.

18. The safeguard enclosure of claim 1, wherein the safety system prevents operation of the collaborative manipulator based on an AGV location signal from the AGV location sensor and based on an object presence signal from the presence sensor.

19. The autonomous part processing system of claim 16, wherein the safety system restricts operation of the AGV when no presence of the AGV is detected by the AGV location sensor.

20. The autonomous part processing system of claim 16, wherein the safety system allows normal operation of the AGV when presence of the AGV at the parking spot is detected by the AGV location sensor.

* * * * *